United States Patent
Paar et al.

(10) Patent No.: US 9,850,388 B2
(45) Date of Patent: *Dec. 26, 2017

(54) CATIONIC WATER-DILUTABLE BINDERS

(71) Applicant: Allnex Austria GmbH, Werndorf (AT)

(72) Inventors: Willibald Paar, Graz (AT); Florian Lunzer, Graz (AT); Roland Feola, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 150 days.

This patent is subject to a terminal disclaimer.

(21) Appl. No.: 15/028,742

(22) PCT Filed: Oct. 17, 2014

(86) PCT No.: PCT/EP2014/072301
§ 371 (c)(1),
(2) Date: Apr. 12, 2016

(87) PCT Pub. No.: WO2015/055805
PCT Pub. Date: Apr. 23, 2015

(65) Prior Publication Data
US 2016/0272823 A1 Sep. 22, 2016

(30) Foreign Application Priority Data
Oct. 17, 2013 (EP) .................... 13189133

(51) Int. Cl.
*C25D 9/02* (2006.01)
*C09D 5/44* (2006.01)
*C08G 59/18* (2006.01)
*C25D 5/48* (2006.01)
*C25D 5/50* (2006.01)

(52) U.S. Cl.
CPC ......... *C09D 5/4438* (2013.01); *C08G 59/184* (2013.01); *C25D 5/48* (2013.01); *C25D 5/50* (2013.01); *C25D 9/02* (2013.01)

(58) Field of Classification Search
CPC .................... C25D 9/02; C09D 5/4438
See application file for complete search history.

(56) References Cited

U.S. PATENT DOCUMENTS

| 5,554,700 A | 9/1996 | Schipfer et al. |
| 5,670,441 A | 9/1997 | Foedde et al. |
| 5,936,013 A | 8/1999 | Feola et al. |
| 2003/0021999 A1 | 1/2003 | Paar et al. |
| 2011/0068009 A1* | 3/2011 | Okada ............ C09D 5/08 205/50 |

FOREIGN PATENT DOCUMENTS

| AT | 397 820 | 7/1994 |
| EP | 2 319 877 | 5/2011 |

OTHER PUBLICATIONS

International Search Report dated Jan. 20, 2015 in International Application No. PCT/EP2014/072301.

* cited by examiner

*Primary Examiner* — Brian W Cohen
(74) *Attorney, Agent, or Firm* — Wenderoth, Lind & Ponack, L.L.P.

(57) ABSTRACT

The invention relates to a process for cationic electrodeposition coating using cationic water-dilutable binders comprising a water-soluble bismuth salt or chelate complex B, and a chain-extended epoxy-amine adduct EA which comprises moieties derived from epoxide compounds E2 having at least two epoxide groups per molecule, low molar mass epoxide compounds E3 having two epoxide groups per molecule, one or more of amidoamines A41 having at least one amide group and at least one amino group, made from amines A1 having at least two amino groups per molecule and a fatty acid A4, further amines A1, an amine A2 which has at least one secondary amino group per molecule, an amine A3 having at least one tertiary, and at least one primary amino group per molecule, fatty acids A4, and phenolic compounds A5 having at least two phenolic hydroxyl groups.

16 Claims, No Drawings

CATIONIC WATER-DILUTABLE BINDERS

FIELD OF THE INVENTION

The invention relates to cationic water-dilutable binders, to a process of making such binders, and to a method of use thereof to protect base metals from corrosion.

BACKGROUND OF THE INVENTION

Cathodic electrodeposition, also referred to as "CED", is an accepted and efficient way to provide substrates of base metals with a protective film layer in order to prevent corrosion. These binders usually comprise a film-forming resin based on epoxide resin-amine adducts or acrylic resins having amino groups that can be dispersed in water upon neutralisation with an acid, and form cations usually based on organically substituted ammonium structures. These cations are deposited on conductive layers that form the cathode of an electrochemical system in a bath containing this cathode metal substrates, an anode, and a bath filled with an aqueous dispersion of the binder, and optionally, pigments and fillers that are admixed to the binder in the form of a pigmented paste, are discharged on this cathode, and build a layer that is subsequently, after rinsing the surface to remove residues of the bath liquid, baked to crosslink the deposited paint film. This film usually has a layer thickness of from 0.015 mm to 0.035 mm. Commonly used crosslinkers include blocked, or capped, isocyanates that are uncapped by the action of heat (up to 185° C.), to split off the blocking agent, and free the isocyanate functional groups of the crosslinker that can then react with hydroxyl groups or amino groups present in the binder to form the cured paint layer. Common blocking agents are volatile organic compounds having functional groups that reversibly add to an isocyanate group under formation of a urethane or urea group, such as hydroxy-functional compounds which may be phenols, oximes, aliphatic alcohols, or partial esters of multivalent alcohols, amine-functional compounds such as aliphatic amines, mixed aromatic-aliphatic amines, lactams, pyrazoles, and also C—H acidic compounds such as malonates. Due to the release of these blocking agents during curing, a loss in mass is observed, referred to as "stoving loss", which also is frequently manifested in the form of bubbles that may be formed in the paint layer during curing if the gaseous blocking agents cannot escape from the paint film due to formation of a less permeable surface of the paint film. Moreover, a substantial amount of energy is used to heat the substrate to a temperature where the blocking agent is cleaved from the blocked isocyanate. Lastly, the gaseous blocking agents which are often irritant or even toxic, have to be collected and removed from the exhaust air of the baking ovens by appropriate treatment such as incineration which also consumes energy.

Such known primers are normally deposited on very well pretreated metal substrates. Typical metal pretreatments are thin layers consisting of metal salts based on zinc, zirconium or iron phosphate or similar chemicals. Deposition on blank steel normally cannot be applied as the adhesion of the cathodic deposited and crosslinked layer is insufficient and does not give good enough corrosion resistance, even when overcoated by other layers.

It has therefore been the object of this invention to provide a coating system which can be applied to a conductive substrate by the method of cathodic electrodeposition, and overcoated with crosslinkable topcoats and which avoids the disadvantages as mentioned hereinabove.

SUMMARY OF THE INVENTION

A cationic water-dilutable binder has been provided by this invention that can be applied to a conductive substrate by the method of cathodic electrodeposition which binder dries physically, i. e. without addition of a chemical substance, referred to as crosslinker, which crosslinker reacts with a resinous binder in a polycondensation or polyaddition reaction, or initiates a polymerisation of polymerisable, usually olefinically unsaturated, resinous binder.

The invention therefore relates to a process to coat substrates of base metals comprising dipping the substrates in a bath comprising a cationic water-dilutable binder by cathodic electrodeposition followed by removing the coated substrate from the bath, rinsing or otherwise cleaning its surface, and subjecting the coated substrate to a drying step at a temperature of from 60° C. to 120° C. for a time between five minutes and two hours, and, preferably coating the dried coated substrate with at least one further layer, wherein the cationic water-dilutable binder comprises a chain-extended epoxy amine adduct resin EA and a water-soluble bismuth salt or chelate complex B comprising bismuth ions and an organic acid-functional moiety, dispersed in water.

Preferably, this bismuth salt B is present in an amount such that the amount of substance n(Bi) of elemental bismuth, divided by the mass m(R) of resin solids present in the dispersion is from 2 mmol/kg to 1000 mmol/kg, preferably from 5 mmol/kg to 500 mmol/kg, and with particular preference, from 10 mmol/kg to 300 mmol/kg.

Although bismuth salts have been used as catalysts in systems comprising cationic binders, in order to accelerate the chemical crosslinking process as described in AT 397 820 B, particularly the transurethanisation, transesterification or transamidation reactions which occur between binder resin and crosslinker, the effect of the addition of a bismuth salt to enhance the corrosion protection of a paint film of a physically drying binder based on chain-extended epoxy amine adducts has not yet been disclosed.

The cationic water-dilutable binders used in the process of this invention comprise a water-soluble bismuth salt or chelate complex B comprising bismuth ions and an organic acid-functional moiety, and a chain-extended epoxy-amine adduct EA which comprises moieties derived from optional: epoxide compounds E1 having on average at least one, and less than two, epoxide groups per molecule, epoxide compounds E2 having at least two epoxide groups per molecule, low molar mass epoxide compounds E3 having two epoxide groups per molecule, and a molar mass of from 170 g/mol to 800 g/mol, one or more of amidoamines A41 having at least one amide group and at least one amino group, made from amines A1 having at least two amino groups per molecule, and from three to twenty carbon atoms, selected from the group consisting of at least two primary amino groups per molecule, at least one primary and at least one secondary amino group per molecule, and at least two secondary amino groups per molecule, and a fatty acid A4 which has from six to thirty carbon atoms and, optionally, at least one olefinic unsaturation per molecule, further amines A1 having at least two amino groups per molecule, and from three to twenty carbon atoms, selected from the group consisting of at least two primary amino groups per molecule, at least one primary and at least one secondary amino group per molecule, and at least two secondary amino groups per molecule, an amine A2 which has from three to twenty carbon atoms and at least one secondary amino group per molecule, and optionally, at least one further reactive group which are preferably hydroxyl groups, an amine A3 having from four to twenty carbon atoms and at least one tertiary, and at least one primary amino group per molecule, fatty acids A4 having from six to thirty carbon atoms, and one carboxylic acid group, or mixtures of two or more of such fatty acids, whereunto optionally, a minor amount of up to 20% of the mass of fatty acids A4, of a dicarboxylic or higher functional acid A4' may be added, which higher functional acids A4' are preferentially dimeric fatty acids, phenolic compounds A5 having from six to twenty carbon atoms and at least two phenolic hydroxyl groups, diols A6 having from 4 to 8 carbon atoms, polyalkylene glycols A7.

The water-soluble bismuth salt or chelate B is preferably prepared by heating under stirring, bismuth oxide $Bi_2O_3$ or a basic bismutyl compound, both individually or collectively referred to as B1, with an excess of from 100% to 700% of the stoichiometric amount of an organic acid B2 and/or an organic chelate former B3 in water.

The epoxy amine adduct EA preferably is made in a process wherein in step a, a mixture M1 is prepared from one or more of A41, A1, A2, A3, A4, and A5, in an optional step b, the mixture M1 is reacted with an epoxide compound E1 to reduce the number of epoxide-reactive groups to between 50% and 90% of the number of such groups in the mixture M1 before this reaction step, to yield a mixture M2 in an optional step c, at least one of A1, A2, A3, A4, A5, A6 and A7 are added to the mixture of preceding step a, M1, or the mixture of preceding step b, M2, to yield a mixture M3, in the step d, the mixture of preceding step a, M1, or the mixture of preceding step b, M2, or the mixture of preceding step c, M3, is optionally diluted with an inert solvent S, and epoxide compound E2 is added under heating, wherein the quantity of E2 is chosen to correspond to from 30% to 70% of the epoxide-reactive groups comprised in mixture M1, or in mixture M2 if optional step b is performed, or in mixture M3 if optional steps b and c are performed, and the reaction is continued until at least 95% of the epoxide groups in E2 are consumed, to form an intermediate I in an optional step e, a solution of the bismuth salt or chelate B in deionised water is prepared by heating under stirring, bismuth oxide $Bi_2O_3$ or a basic bismutyl compound, both individually or collectively referred to as B1, with an excess of from 100% to 700% of the stoichiometric amount of an organic acid B2 and/or an organic chelate former B3, in step f, the solution of the intermediate I of step d is added under stirring with or to deionised water to form a dispersion, and in step g, after optional addition of further water, the dispersion of step f is heated, and epoxide compound E3 is added and reacted until all epoxide groups are consumed to form the chain-extended epoxy amine adduct EA.

The water-soluble bismuth salt or chelate B can be added to the chain-extended epoxy-amine adduct EA after its formation in which case step e is performed separately. In this case, a water-soluble organic acid, such as lactic acid, formic acid or acetic acid is preferably added in step f to neutralize the epoxy-amine adduct.

According to a preferred embodiment, the water-soluble bismuth salt or chelate B is added during the synthesis of the chain-extended epoxy-amine adduct, more preferably in step e, before step f.

The aqueously dispersed mixture of chain-extended epoxy amine adducts EA and a bismuth salt or chelate B as described hereinabove, or made by the process as detailed hereinabove can be used to form coating films on substrates where comprising mixing and homogenising the binder mixtures, where optionally, pigments and/or fillers may be added to this binder mixtures to form a coating composition, which said coating composition is applied to a substrate preferably by cationic electrodeposition, and subjected to drying without addition of a curing agent.

DETAILED DISCLOSURE OF THE PREFERRED EMBODIMENTS

In a preferred embodiment, moieties derived from an amidoamine A41 and at least one of the amines A1, A2, and A3 are present in the epoxy amine adduct EA.

In a further preferred embodiment, an amidoamine A41 and at least one of the amines A1, A2, and A3 are present in mixture M1.

In a further preferred embodiment, an amidoamine A41, an amine A1, and at least one of the amines A2 and A3 are present in mixture M1.

In a further preferred embodiment, an amidoamine A41, an amine A2 and at least one of the amines A1 and A3 are present in mixture M1.

In a further preferred embodiment, an amidoamine A41, and amine A3, and at least one of the amines A1 and A2 are present in mixture M1.

In a further preferred embodiment, at least one of the amines A1, A2, and A3 is added to the mixture M2.

In a further preferred embodiment, moieties derived from an amidoamine A41, an amine A1, and at least one of the amines A2 and A3 are present in the epoxy amine adduct EA.

In a further preferred embodiment, moieties derived from an amidoamine A41, an amine A2, and at least one of the amines A1 and A3 are present in the epoxy amine adduct EA.

In a further preferred embodiment, moieties derived from an amidoamine A41, an amine A3, and at least one of the amines A1 and A2 are present in the epoxy amine adduct EA.

In a further preferred embodiment, a fatty acid A4 is present in mixture M1.

In a further preferred embodiment, moieties derived from a phenolic compound A5 are present in the epoxy amine adduct EA.

In a further preferred embodiment, a phenolic compound A5 is present in the mixture M2.

In a further embodiment, a diol A6 and/or a polyalkylene glycol A7 is present in the mixture M2.

In a further preferred embodiment, the mixture M1 is reacted with an epoxide compound E1 having on average, at least one, and less than two, epoxide groups per molecule.

The epoxide components E1 have at least one, and preferably on average, not more than two, 1,2-epoxide groups per molecule, and are of aromatic or aliphatic nature. Glycidyl ethers of monohydric aliphatic or mixed aliphatic-aromatic alcohols, or glycidyl esters of aliphatic or aromatic monocarboxylic acids are preferred as monoepoxides. The alcohols are preferably selected from the group consisting of 2-ethyl hexanol, decanol, tridecanol, stearyl alcohol, and benzyl alcohol. The acids are preferably selected from the group consisting of branched aliphatic monocarboxylic acids having from 5 to 11 carbon atoms, particularly, glycidyl neopentanoate, glycidyl 2-ethyl hexanoate, glycidyl neodecanoate, and the mixtures of such acids which are commercially available under the trade names of ®Versatic acids. Mixtures of such ethers and such esters can likewise be used. Such mixtures are preferably made in a way that the average number of epoxide groups per molecule, is at least 1.0, and no more than 2.0, preferably, from 1.2 to 1.8.

The epoxide components E2 have on average two epoxide groups per molecule, and preferably have a specific amount of epoxide groups in the range of from 3.0 mol/kg to 5.8 mol/kg ("epoxide equivalent" from 170 g/mol to 333 g/mol). Particularly preferred are aromatic epoxide resins based on aromatic dihydroxy compounds where the hydroxyl group is bound to an aromatic carbon atom, such as those derived from bisphenol A, bisphenol F, particularly the liquid resins.

As epoxide component E3, diglycidyl ethers of aromatic or aliphatic diols, and diglycidyl esters of aromatic or aliphatic diacids can be used. Among the diglycidyl ethers of diols, the diglycidyl ethers of bisphenol A (2,2-bis-(4-hydroxyphenyl)-propane), and of bisphenol F (bis-(4-hydroxyphenyl)-methane) are preferred, as well as the diglycidyl ethers of ethylene glycol, 1,-4-butylene glycol, and of oligomeric or polymeric 1,2-propylene glycols. As diglycidyl esters, particularly those derived from dimeric fatty acids are mentioned here. Both the glycidyl ethers of aliphatic oligomeric or polymeric diols, as well as the diglycidyl esters of aliphatic diacids act as flexibilising components in the epoxy amine adducts of this invention.

Particularly preferred are epoxide compounds having a molar mass of at least 170 g/mol and up to 800 g/mol, and among these, epoxide resins made from bisphenol A and epichlorohydrin. It is especially preferred to use the diglycidyl ether of bisphenol A, having a specific amount of epoxide groups of from 5.68 mol/kg to 5.81 mol/kg ("epoxide equivalent" of 172 g/mol to 176 g/mol).

The amines A1 are selected from aliphatic linear, branched, or cyclic amines each having at least one secondary and at least one primary amino group, preferably two primary amino groups, and from three to twenty carbon atoms. Preferred amines include N-methyl ethylene diamine, 3- or 4-aminopiperidine, diethylene triamine, triethylene tetramine, tetraethylene pentamine, N,N'-bis-(2-aminoethyl)-1,3-diamino-propane, N,N'-bis-(3-aminopropyl)-1,2-diaminoethane, N,N'-bis-(3-aminopropyl)-1,3-diaminopropane, N,N'-bis-(3-aminopropyl)-1,4-diaminobutane, N,N'-bis-(4-aminobutyl)-1,4-diaminobutane, 4,4'-diaminodibutylamin (dibutylene triamine), N,N'-bis-(6-aminohexyl)-1,6-diaminohexane, and 6,6'-diamino-dihexyl-amine (bis-hexamethylene triamine).

The acids A4 are fatty acids having one carboxyl group, and from six to thirty carbon atoms, preferably from eight to twenty-four carbon atoms. They are either saturated or singly or multiply unsaturated, and may also be used as mixtures, particularly in the form of naturally occurring mixtures as obtained by processsing of oils and fats. Preferred fatty acids include stearic acid, palmitic acid, oleic acid, linoleic acid, linolenic acid, arachidonic acid, behenic acid, erucic acid, and among the mixtures, linseed oil fatty acid, soy bean oil fatty acid, coconut oil fatty acid, rapeseed oil fatty acid, and tall oil fatty acid.

In a preferred embodiment, a small amount corresponding to a mass of not more than 20% of the fatty acids A4, of aliphatic dicarboxylic acids A4' such as glutaric, adipic, and cyclohexane dicarboxylic, acids can be added to the fatty acids A4. Preferred as acids A4' are dimeric fatty acids.

The amines A2 are aliphatic linear, branched or cyclic secondary amines having preferably one secondary amino group, and from three to twenty carbon atoms, preferably from four to fourteen carbon atoms. They may also carry further substituents that can be non-functional, such as alkoxy groups, or can be functional such as hydroxyl groups. Among the preferred amines are di-n-butylamine, diethanolamine, and bis-2-hydroxypropylamine. Mixtures of these can also be used.

The amines A3 are aliphatic linear, branched or cyclic amines having one tertiary, and at least one primary amino group, and from four to twenty carbon atoms. Preferred amines are N,N-dimethylaminoethylamine, N,N-diethylaminoethylamine, N, N-dimethylaminopropyl-amine-3, N,N-diethylaminopropylamine-3, N-(2-aminethyl)-piperidine, and N,N'-bis(2-aminoethyl)-piperazine. Mixtures of these can also be used.

The phenolic compounds A5 having from six to twenty carbon atoms and at least two phenolic hydroxyl groups are preferably dihydroxy aromatic compounds such as resorcinol, hydroquinone, dihydroxydiphenyl, dihydroxydiphenyl sulphone, bisphenol A, bisphenol F, which may optionally be substituted by alkyl or alkoxy groups such as methyl or methoxy groups, halogen groups, or trifluoromethyl groups. If phenolic compounds having three or more phenolic hydroxyl groups are used in mixture with dihydroxy aromatics, the amount of higher functional compounds should be limited to not more than 10% of the mass of all such phenolic compounds, or compensated by addition of monofunctional phenolic compounds to limit the degree of branching in the resultant polyadduct EA.

The diols A6 are preferably aliphatic or cycloaliphatic diols containing 4 to 8 carbon atoms, such as 1,4-butane diol and 1,6-hexanediol.

The polyalkylene glycols A7 are preferably selected from polyethylene glycol, polypropylene glycol or polybutylene glycol.

The amidoamines A41 are reaction products of the fatty acids A4 as defined supra, and of amines A1 which are also defined supra, which have at least one amide group, and at least one amino group which has not been converted to an amide group. Usually, in an amine having both primary and secondary amino groups, and with a stoichiometry that provides one mole of fatty acid per one mole of primary amino groups, the main reaction product is an amidoamine with amide groups stemming from the primary amino groups, and with unreacted secondary amino groups. In the preferred case of using an amine A1 which has two primary amino groups, and at least one secondary amino group, amidoamines A41 are formed that have two amide groups, and at least one secondary amino group.

Any water-soluble bismuth salt or bismuth chelate complex B can be used in the context of this invention. Preferred salts are bismuth salts having an anion derived from an organic acid, which may be a carboxylic, sulphonic, or phosphorus-based acid. Particularly preferred are Bi-salts of organic hydroxy acids having one carboxylic group and at least one hydroxyl group, such as the salts of glycolic acid, lactic acid, 2- or 3-hydroxybutyric acid, 3-hydroxyisobutyric acid, 2,2-bis-hydroxymethyl propionic acid, 2,2-bis-hydroxymethyl butyric acid. If bismuth salts of inorganic acids, such as nitric acid, or bismuth salts of an organic acid such as methanesulphonic acid that does not have hydroxyl groups or keto groups or amino groups are used, it has proven advantageous to add a chelate former such as aminopolycarboxylates, notably iminodiacetate, nitrilotriacetate, ethylenediamine tetraacetate, diethylenetriamine pentaacetate, 2-hydroxyethyliminodiacetate, and pyridine dicarboxylate, etc. A salt or chelate is regarded as "water-soluble" in the context of this invention if a saturated salt solution at 23° C. has a mass fraction of dissolved Bi salt or chelate complex in the solution of at least 0.05 g/100 g.

The process to form the chain extended epoxy-amine adduct is generally conducted at a temperature of from 40° C. to not more than 105° C., and under thorough stirring to ensure temperature control. Chain extension of the epoxy amine adduct in the last step has to be made in the dispersed phase in order to be able to cope with the high resin viscosity.

In a preferred embodiment, in step a of the process, the mixture M1 is prepared from an amidoamine A41, an amine A2, and an amine A3.

In a further preferred embodiment, step c of the process is executed, and amines A2 and A3 and a phenolic compound A5 are added to the mixture of preceding step a, M1, or to the mixture of preceding step b, M2, to yield a mixture M3.

It is also preferred to use both the above selections together in the process.

In a particularly preferred embodiment of the process, an amidoamine A41 is made in a separate step from an amine A1 and a fatty acid A4, where preferably, the amine A1 has one secondary amino group and two primary amino groups, such as diethylene triamine, dibutylene triamine, and bis-hexamethylene triamine, and the fatty acid A4 preferably has an iodine number of from 120 cg/g to 195 cg/g.

It is also preferred to prepare a mixture comprising the amidoamine A41, a further fatty acid A4 which is preferably unsaturated, and has an iodine number of from 100 cg/g to 150 cg/g, and a further amine A1, and to react this mixture with a monoepoxide E1, preferably a glycidyl ester of an aliphatic branched monocarboxylic acid having from four to twelve carbon atoms, to reduce the functionality of the mixture. After addition of a phenolic compound A5, preferably, bisphenol A or bisphenol F, an amine A2 which is preferably diethanolamine, and an amine A3 which is preferably diethylaminopropylamine or dimethylaminopropylamine, the an inert solvent and an epoxide resin E2 are added and reacted until the epoxide groups were consumed. This resin is then dispersed in water wherein a bismuth salt or chelate complex had been dissolved before. After heating this dispersion to a temperature of preferably between 60° C. and 90° C., a second epoxide compound E3 is added, where preferably the amount n(EP,3) of epoxide groups in this epoxide compound E3 divided by the amount n(EP,2) of epoxide groups of the an epoxide resin E2 is from 0.05 mol/mol to 0.35 mol/mol, particularly preferred from 0.1 mol/mol to 0.30 mol/mol.

The aqueous dispersions thus obtained have generally a mass fraction of solids of between 20% and 60%. The epoxy amine adducts EA have preferably an amine number of from 40 mg/g to 150 mg/g, and hydroxyl numbers of from 30 mg/g to 150 mg/g, in each case in relation to the mass of solid resin. Their Staudinger index is preferably from 30 $cm^3/g$ to 100 $cm^3/g$, particularly preferably from 40 $cm^3/g$ to 90 $cm^3/g$, as measured on solutions in N-methyl pyrrolidone at room temperature (23° C.). A value of 60 $cm^3/g$ corresponds to a weight-average molar mass of 40 kg/mol, as measured by gel permeation chromatography using polystyrene standards in the usual way.

The aqueous coating compositions can be used as such in the process according to the invention or they can be used to formulate coating compositions by adding usual additives such as coalescing agents, wetting agents, optionally pigments, and rheology additives. In the process according to the invention the dispersions are usually diluted with further water to a mass fraction of solids of about 15%, and are deposited from a bath containing this dispersion onto metal substrates which serve as cathodes.

The coating obtained from the aqueous coating composition can be dried at a temperature of from 50° C. to 130° C. As the film is physically drying, there is no need to add a chemical crosslinker such as blocked isocyanates. Consequently, there is no need to split off a blocking agent which needs higher temperature, and thus, more energy, and leads to air pollution by the cleavage products of the blocked isocyanates. If cleavage products from the blocked isocyanates are trapped in the coating film and cannot escape due to premature solidification of the surface of the coating film, they may lead to formation of bubbles in the dried coating film.

In the process according to the invention, the substrates are coated by dipping the substrates in a bath comprising the cationic water-dilutable binder described here above. The substrate act as cathode. The bath can be a normal e-coat tank equipment known in the art.

The cathodic electrodeposition is usually done with a deposition voltage of 30 to 400 V, preferably 60 to 360 V. The coated substrate is then removed from the bath, optionally its surface is rinsed or otherwise cleaned with the aid of water or a solvent, and then the coated substrate is dried physically at a temperature of from 50 to 150° C., preferably from 60 to 120° C., and more preferably from 65 to 100° C., usually for a time between five minutes and two hours, preferably from 10 to 60 minutes. During this drying, the residual water is evaporated from the film.

The cationic water-dilutable binders used in the process according to the present invention preferably contain less than 1% by weight of crosslinker. By crosslinker is understood a resin or a chemical that has at least two reactive groups which can react with the epoxy-amino adduct EA for build a network. The bath preferably is substantially free of crosslinker, more specifically of isocyanate or blocked isocyanate crosslinker.

After the drying step, a coating is formed on the substrate and this coating does not need further heating at a temperature of higher than 130° C. to obtain a coated substrate which can easily be used. The coated substrate can then be used as such, but is preferably coated by one or more further coating layers.

In the process according to the invention, there is no need to heat the coated substrate at a temperature of higher than 130° C. before applying a further layer to the coated substrate.

After the drying of the coated substrate withdrawn from the bath, at least one further layer T can be deposited on the dried coated substrate. The application of the further layer or layers can be done by any processes known therefore such as by spraying, rolling or dipping.

The further layer T can be made from coating systems known in the art, such as waterborne or solventborne 2 component systems, such as OH containing acrylic and/or polyester polymers in combination with crosslinkers such as isocyanates; waterborne or solventborne 1 component systems, such as OH containing acrylic and/or polyester polymers in combination with blocked isocyanates or amino resins; powder coating compositions; airdrying waterborne binders having oxygen reactive double bonds; airdrying solventborne binders having oxygen reactive double bonds.

The further layer T is preferably made from solventborne topcoat coating 2 component compositions based on OH functional acrylic resins in combination with polyisocyanates.

The process according to the invention permits to obtain good quality coatings with a very good corrosion resistance, even in severe conditions. The process according to the invention permits a substantial energy saving over the current CED processes in that it is not needed to heat coated substrates to a high temperature to activate the crosslinker. Moreover the collection and removal of blocking agents used in combination with CED resins is no longer necessary.

The quantity formerly referred to as "limiting viscosity number", called "Staudinger index" $J_g$ in accordance with DIN 1342, part 2.4, is the limiting value of the Staudinger function $J_v$ measured with decreasing concentration and shear stress, wherein $J_v$ is the ratio of the relative change in viscosity $\eta_r-1$, divided by the mass concentration $\beta_B = m_B/V$ of the solute B (mass $m_B$ of the solute in a volume V of the solution), given by $J_v = (\eta_r-1)/\beta_B$. $\eta_r-1$ stands for the relative change in dynamic viscosity, according to $\eta_r-1 = (\eta-\eta_s)/\eta_s$. The relative viscosity $\eta_r$ is the ratio of the dynamic viscosity $\eta$ of the solution under consideration and the dynamic viscosity $\eta_s$ of the pure solvent. The physical significance of the Staudinger index is that of a specific hydrodynamic volume of the solvated polymer coil at infinite dilution and at rest. The unit conventionally used for J is "$cm^3/g$"; formerly also "dL/g".

The invention is further illustrated by the following examples. In these examples as well as in the whole specification, all quantities measured in "%" relate to mass fractions or mass ratios, as measured in cg/g or g/hg, except where specifically denoted otherwise.

EXAMPLES

Example 1

1.1 Epoxide Amine Adduct Resin Dispersion 228 g (1 mol) of Bisphenol A were mixed with 210 g (2 mol) diethanolamine in 400 g methoxypropanol and reacted at 130° C. with 800 g of an aromatic epoxy resin BADGE based on Bisphenol A with a specific amount of epoxy groups of 5.26 mol/kg (epoxide equivalent of 190 g/mol). The temperature was kept until all epoxide groups were reacted.

Then the reaction mass was poured into a flask with 1600 g of deionised water wherein the reaction product of 89 g (93 mmol) of methane sulfonic acid and 11.0 g (23.6 mmol) of $Bi_2O_3$ was dissolved. A cationic dispersion was obtained with a mass fraction of solids of 40%, containing a mass fraction of Bi of 0.32%, based on the mass of the dispersion.

1.2 Chain-Extended Epoxide Amine Adduct Resin Dispersion (CED1)

The mixture prepared in Example 1.1 was heated to 80° C. At this temperature, 200 g of BADGE were added and kept at 80° C., until all epoxide groups were consumed. The final product had a Staudinger index of 80 $cm^3/g$, correlating with a weight average molar mass $M_w$ of 350 000 g/mol, and a glass transition temperature $T_g$ of 45° C. The mixture was further diluted with 6500 g of deionised water to form a dispersion (CED1) with a mass fraction of solids of 15%. The specific amount of bismuth in this dispersion was 0.1%, based on the mass of the dispersion.

Example 2

2.1 Synthesis of an Amido Amine 215 g (1 mol) of bis-hexamethylenetriamine were reacted with 560 g (2 mol) of linseed oil fatty acid at 180° C. under removal of the water liberated in the condensation reaction until an amine number of 76 mg/g was reached. The reaction product consisted mostly of amide made by reaction of the primary amino groups with the acid, as evidenced by NMR analysis.

2.2 Epoxide Amine Adduct Resin Dispersion 739 g (1 mol) of the bis-amidoamine of Example 2.1 were mixed with 280 g (1 mol) of tall oil fatty acid and 222 g of bis hexamethylenetriamine (1.07 mol), and this mixture was reacted with 774 g of glycidyl neodecanoate (®Cardura E 10, Momentive Specialty Chemicals) at 90° C. for two hours. Then, 968 g of bisphenol A, 206 g of diethanolamine and 184 g of dimethylaminopropylamine were added. The mixture was diluted with 800 g of methoxypropanol. Then, 3500 g of an aromatic epoxy resin based on Bisphenol A with a specific amount of epoxy groups of 5.26 mol/kg (epoxide equivalent of 190 g/mol) were added, during which addition the temperature was raised by exotherm to reflux of the solvent. The reflux temperature was kept until all epoxide groups were consumed. Then the reaction mass was poured into a flask with 8800 g of deionised water wherein the reaction product of 1500 g of dimethylolpropionic acid and 700 g of $Bi_2O_3$ was dissolved. A cationic dispersion was obtained with a mass fraction of solids of 48.5%, containing a mass fraction of Bi of 0.34%, based on the mass of the dispersion.

2.3 Chain-Extended Epoxide Amine Adduct Resin Dispersion (CED2)

The mixture prepared in Example 2.2 was diluted with 1445 g of deionised water to a mass fraction of solids of 45%, and heated to 80° C. At this temperature, 400 g of BADGE were added and kept at 80° C., until all epoxide groups were consumed. The final product had a Staudinger index of 60 $cm^3/g$, correlating with a weight average molar mass $M_w$ of 40 kg/mol, and a glass transition temperature $T_g$ of 35° C. The mixture was further diluted with 42.43 kg of deionised water to form a dispersion (CED2) with a mass fraction of solids of 15%. The specific amount of bismuth in this dispersion was 56 mmol/kg, based on the mass of the dispersion.

Example 3

3.1: Preparation of a Watersoluble Bismuth Salt 362 g (2.7 mol) of Dimethylolpropionic acid and 675 g of deionized water were charged into a 4 l glass flask, equipped with a stirrer and a reflux-condenser. The solution was heated to 75° C. 111 g (0.24 mol) of Bi2O3 were added under good stirring in small portions within 60 minutes. Then the mixture was allowed to stir for further 60 minutes at this temperature, whereby a greyish-white, slightly opaque solution was obtained (no more undissolved yellow parts of Bi2O3 to be seen). Finally, 1282 g of deionized water were added and the solution was cooled to room temperature. The obtained Bismuth salt preparation has a Bismuth content of 4.1%.

3.2 Chain-extended Epoxide Amine Adduct Resin Dispersion with the Foregoing Bismuth Salt Solution (CED3)

228 g (1 mol) of Bisphenol A were mixed with 210 g (2 mol) diethanolamine in 400 g methoxypropanol and reacted at 130° C. with 800 g of an aromatic epoxy resin BADGE based on Bisphenol A with a specific amount of epoxy groups of 5.26 mol/kg (epoxide equivalent of 190 g/mol). The temperature was kept until all epoxide groups were reacted.

Then the reaction mass was poured into a flask, precharged with a mixture of 1380 g of deionised water and 13.5 g (75 mmol) of lactic acid (50% in water). The mixture was homogenized for 1 hour under stirring. A preliminary cationic dispersion was obtained with a mass fraction of solids of 41%. At 80° C., 200 g of BADGE were added and temperature was kept at 80° C., until all epoxide groups were consumed.

The cationic dispersion was allowed to cool to 50° C., 255 g of the Bismuth salt preparation of Example 3.1 was added continuously over 15 minutes, then stirring was continued for additional 60 minutes. A cationic dispersion was obtained with a mass fraction of solids of 42.9%, containing a mass fraction of Bi of 0.30%, based on the mass of the dispersion. The final product had a Staudinger index of 76 cm$^3$/g, correlating with a weight average molar mass $M_w$ of 330 000 g/mol, and a glass transition temperature $T_g$ of 42° C.

Comparative example 4R—Aqueous Dispersion CED4R

A paint was prepared according to example 5, paint 1 of EP 2 319 877 (here after called CED4R). The epoxy amine adduct is similar to the one described in Example 2 except that it contains a blocked polyisocyanate and that no bismuth salt is added.

Comparative Example 5R—Aqueous Dispersion CED5R

The cationic dispersion obtained after step 2.2 of Example 2 was diluted with 1445 g of deionized water to a mass fraction of solids of 45%.

Coating Test

Steel panels were coated with the dispersions CED1, CED2 and CED3 of Examples 1.2, 2.3, 3.2 and CED4R and CED5R of Comparative examples 4R and 5R—all the dispersions used were diluted to be at 15% of solids. The coating was done by cathodic electrodeposition, at 35° C. for two minutes, and using a voltage of 300 V.

The panels were dried for 10 minutes at 80° C. An even film with a thickness specified in Table 1 was obtained.

The panels coated with dispersion CED4R were not dry after such cure and hence needed to be dried at 180° C. for 25 min.

The panels coated with dispersion CED5R were still sticky after drying at 80° C. for 10 minutes but could be used as such.

The dried panels obtained with dispersions CED1, CED2, CED3, CED5R have oven losses of 0.5% (measured by heating from 60° C. to 120° C.).

The dried panels obtained with dispersion CED 4R have oven losses of 12.5% (measured by heating from 120 to 180° C.).

Common CED paints using blocked isocyanates as curing agents exhibit oven losses of between 10% and 15% under the same conditions.

After the drying, the panels were overcoated with the topcoats T1 to T 5 as described here under.

Topcoat T1:wb 1 Pack Oven Drying Topcoat

The components of Part I (wt %) as detailed here under were mixed and dispersed for about 30 min on a pearl mill. Then components of Part II were added in mentioned order.

Part I
25.10 VIACRYL® SC6807w/42WA (wb OH functional styrene acrylic copolymer)
21.30 titanium dioxide
0.90 wetting & dispersing agent
1.10 pigment dispersing agent
0.10 silicone based slip & levelling agent
4.00 butyl-diglycol
4.00 deionized water
Part II
22.50 VIACRYL® SC6807w/42WA
7.30 CYMEL®327
0.90 butyldiglycol
0.90 n-dodecane
2.70 Texanol
1.70 Proglyde DMM
7.50 water deionized The composition was further diluted with deionized water to a viscosity of about 30 s (according to DIN 53 211/23° C., 4 mm) and sprayed on the coated panels with the aqueous dispersions of respectively Examples 1 to 3 and Comparative examples 4R and 5R. Once sprayed the coating was allowed a flash off time of 10 minutes at room temperature, then it was dried for 30 minutes at 140° C.

Topcoat T2: wb 2 Pack Polyurethane Topcoat

The components of Part A (parts by weight) as detailed hereunder were mixed in mentioned order and dispersed for approx. 30 min on a pearl mill. Before application the components of Part B were added in mentioned order and viscosity was adjusted to of approximately 30 s (according to DIN 53 211/23° C., 4 mm with deionized water). After spray application the coating was left to dry at room temperature.

Part A
56.66 MACRYNALOSM6810w/42WA (wb styrene acrylic copolymer with 4% OH on solids)
2.05 wetting agent
34.03 titanium dioxide
0.07 carbon black
0.36 levelling agent
3.21 water deionized
1.83 dimethylethanolamin/10WA
1.67 water deionized
Part B
21.1 EASAQUA™ XD 401
8.06 Solvent naphtha 150/180

Topcoat T 3: wb 1 Pack Air Drying Topcoat:

Components of part A were mixed in mentioned order. The combination drier was diluted 1:1 with deionized water prior to addition. The mixture was dispersed with glass pearls for 60 minutes. Part A2 was premixed and added under stirring.

The coating was spray applied at a viscosity of 30 s (according to DIN 53 211/23° C., 4 mm) and left to dry at room temperature.

Part A
66.00 RESYDROL® AY 6150w/45WA (wb acrylic modified shortoil alkyd)
0.30 ammonia 25%
0.10 AMP-90 (neutralization agent)
0.75 cobalt combination drier
0.75 water deionized Part A
0.30 antiskinning agent
0.70 silicone based levelling agent
23.20 titanium dioxide
0.50 wetting and antisettling agent
0.80 dispersing agent
0.40 deaerator
0.40 defoamer
Part A2
5.65 water deionized
0.15 polyurethane rheology modifier
Topcoat T 4: sb 2 Pack Polyurethane Topcoat The components of Part A as detailed here under were mixed in mentioned order and dispersed for approx. 30 min on a pearl mill. Before application the components of Part B were added in the mentioned order and viscosity was adjusted to of approximately 30 s (according to DIN 53 211/23° C., 4 mm) with a mixture of butylacetate, solvent naphta A and xylene in a ratio of 60:15:25. The topcoat was dried for 30 min at 80° C.

Part A
45.4 MACRYNAL® SM2810/75BAC (acrylic styrene copolymer with 4.2% OH on solids)
40.7 titanium dioxide
2.05 dispersing agent
0.4 antisettling agent
3.7 xylene
3.7 methoxypropylacetate
3.7 butylacetate
0.2 silicone based levelling agent
Part B
16.8 hexamethylenediisocyanate-trimer
6.7 butylacetate
1.7 solventnaphta 150/180
2.8 xylene Topcoat T 5: Powder Topcoat A powder topcoat as detailed in EP0509393A1 was applied by electrostatic spray application on the coated substrates obtained with the aqueous dispersions of Examples 1 to 3 and comparative Examples 4R and 5R and cured at 180° C. for 20 minutes.

The coated panels were put in a salt spray (DIN EN ISO 9227) and humidity chamber. The number of hours in table 1 describes the time, after which the delamination on the scratch was >3 mm (salt spray chamber) and the number of blisters exceeds 2 on a panel with a size of 10×20 cm² (humidity chamber)

TABLE 1

| Test number | CED coated substrate of Example | Film thickness (μm) | Topcoat number | Film thickness (μm) | Salt spray results (h) | Humidity chamber test results (h) |
|---|---|---|---|---|---|---|
| 1T1 | CED1 | 12 | T1 | 42 | 750 | 750 |
| 1T2 | CED1 | 12 | T2 | 55 | 600 | 600 |
| 1T3 | CED1 | 12 | T3 | 47 | 500 | 500 |
| 1T4 | CED1 | 12 | T4 | 61 | 800 | 800 |
| 1T5 | CED1 | 12 | T5 | 58 | 1200 | 1200 |
| 2T1 | CED2 | 16 | T1 | 40 | 1000 | 1000 |
| 2T2 | CED2 | 16 | T2 | 54 | 750 | 750 |
| 2T3 | CED2 | 16 | T3 | 49 | 500 | 500 |
| 2T4 | CED2 | 16 | T4 | 62 | 1000 | 1000 |
| 2T5 | CED2 | 16 | T5 | 57 | 1500 | 1500 |
| 3T1 | CED3 | 14 | T1 | 44 | 800 | 800 |
| 3T2 | CED3 | 14 | T2 | 54 | 750 | 750 |
| 3T3 | CED3 | 14 | T3 | 49 | 500 | 500 |
| 3T4 | CED3 | 14 | T4 | 60 | 1000 | 1000 |
| 3T5 | CED3 | 14 | T5 | 61 | 1500 | 1500 |
| 4RT1 | CED4R | 22 | T1 | 43 | 120 | 50 |
| 4RT2 | CED4R | 22 | T2 | 53 | 50 | 50 |
| 4RT3 | CED4R | 22 | T3 | 49 | 24 | 24 |
| 4RT4 | CED4R | 22 | T4 | 63 | 120 | 120 |
| 4RT5 | CED4R | 22 | T5 | 57 | 240 | 240 |
| 5RT4 | CED5R | 15 | T4 | 51 | 120 | 120 |
| 5RT5 | CED5R | 15 | T5 | 50 | 240 | 240 |

The invention claimed is:

1. A process to coat substrates of base metals comprising dipping the substrates in a bath comprising a cationic water-dilutable binder, by cathodic electrodeposition followed by removing the substrate from the bath, rinsing or otherwise cleaning its surface, and subjecting the coated substrate to a drying step at a temperature of from 60° C. to 120° C. for a time between five minutes and two hours, and wherein optionally the dried coated substrate is further overcoated with at least one other layer,
wherein the said cationic water-dilutable binder comprises a water-soluble bismuth salt or chelate complex B comprising bismuth ions and an organic acid-functional moiety, and a chain-extended epoxy-amine adduct EA which comprises moieties derived from
epoxide compounds E2 having at least two epoxide groups per molecule,
low molar mass epoxide compounds E3 having two epoxide groups per molecule, and a molar mass of from 170 g/mol to 800 g/mol,
one or more of
amidoamines A41 having at least one amide group and at least one amino group, made from amines A1 having at least two amino groups per molecule, and from three to twenty carbon atoms, selected from the group consisting of at least two primary amino groups per molecule, at least one primary and at least one secondary amino group per molecule, and at least two secondary amino groups per molecule, and a fatty acid A4 which has from six to thirty carbon atoms,
further amines A1 having at least two amino groups per molecule, and from three to twenty carbon atoms, selected from the group consisting of at least two primary amino groups per molecule, at least one primary and at least one secondary amino group per molecule, and at least two secondary amino groups per molecule,
an amine A2 which has from three to twenty carbon atoms and at least one secondary amino group per molecule,
an amine A3 having from four to twenty carbon atoms and at least one tertiary, and at least one primary amino group per molecule,
fatty acids A4 having from six to thirty carbon atoms, and one carboxylic acid group,
phenolic compounds A5 having from six to twenty carbon atoms and at least two phenolic hydroxyl groups,
diols A6 having from 4 to 8 carbon atoms,
polyalkylene glycols A7, and optionally: epoxide compounds E1 having on average at least one, and less than two, epoxide groups per molecule wherein the cationic water-dilutable binder is free of an isocyanate crosslinker or blocked isocyanate crosslinker; and wherein the bismuth salt or chelate complex B comprising bismuth ions is present in an amount such that an amount of substance n(Bi) of elemental Bismuth, divided by a mass m(R) of resin solids present in a water dispersion formed with the chain-extended epoxy-amine adduct EA and bismuth salt or bismuth chelate complex is from 2 mmol/kg to 1000 mmol/kg.

2. The process as claimed in claim 1 wherein the epoxide compounds E2 having at least two epoxide groups per molecule have a specific amount of epoxide groups in the range of from 3.0 mol/kg to 5.8 mol/kg.

3. The process as claimed in claim 1 wherein the epoxide component E3 is selected from diglycidyl ethers of aromatic or aliphatic diols, and diglycidyl esters of aromatic or aliphatic diacids.

4. The process as claimed in claim 1 wherein the amines A1 are selected from aliphatic linear, branched, or cyclic amines each having at least one secondary and at least one primary amino group.

5. The process as claimed in claim 1 wherein the acids A4 are fatty acids having one carboxyl group, and from eight to twenty-four carbon atoms.

6. The process as claimed in claim 1 wherein the amines A2 are aliphatic linear, branched or cyclic secondary amines having one secondary amino group.

7. The process as claimed in claim 1 wherein the amines A3 are aliphatic linear, branched or cyclic amines having one tertiary, and at least one primary amino group, and from four to twenty carbon atoms, selected from N,N-dimethyl-aminoethylamine, N,N-diethylaminoethylamine, N,N-dimethyl-aminopropylamine-3, N,N-diethylaminopropylamine-3, N-(2-aminethyl)-piperidine, and N,N'-bis(2-aminoethyl)-piperazine, as well as mixtures of these.

8. The process as claimed in claim 1 wherein the phenolic compounds A5 having from six to twenty carbon atoms and at least two phenolic hydroxyl groups are dihydroxy aromatic compounds selected from resorcinol, hydroquinone, dihydroxydiphenyl, dihydroxydiphenyl sulphone, bisphenol A, bisphenol F, which may optionally be substituted by alkyl or alkoxy groups, halogen groups, or trifluoromethyl groups.

9. The process as claimed in claim 1 wherein the water-soluble bismuth salt or bismuth chelate complex B is selected from the group consisting of bismuth salts having an anion derived from an organic carboxylic, sulphonic, or phosphorus-based acid.

10. The process as claimed in claim 1 wherein the amidoamines A41 have two amide groups, and at least one secondary amino group.

11. The process as claimed in claim 1 wherein the epoxide components E1 having at least one, and preferably on average, not more than two, 1,2-epoxide groups per molecule, are of aromatic or aliphatic nature, and are selected from the group consisting of glycidyl ethers of monohydric aliphatic or mixed aliphatic-aromatic alcohols, and glycidyl esters of aliphatic or aromatic monocarboxylic acids.

12. The process as claimed in claim 1 wherein the cationic water-dilutable binder is prepared by a process wherein in step a, a mixture M1 is prepared from one or more of A41, A1, A2, A3, A4, and A5, in an optional step b, the mixture M1 is reacted with an epoxide compound E1 to reduce the number of epoxide-reactive groups to between 50% and 90% of the number of such groups in the mixture M1 before this reaction step, to yield a mixture M2 in an optional step c, at least one of A1, A2, A3, A4, and A5 are added to the mixture of preceding step a, M1, or the mixture of preceding step b, M2, to yield a mixture M3, in the step d, the mixture of preceding step a, M1, or the mixture of preceding step b, M2, or the mixture of preceding step c, M3, is diluted with an inert solvent S, and epoxide compound E2 is added under heating, wherein the quantity of E2 is chosen to correspond to from 30% to 70% of the epoxide-reactive groups comprised in mixture M1, or in mixture M2 if optional step b is performed, or in mixture M3 if optional steps b and c are performed, and the reaction is continued until at least 95% of the epoxide groups in E2 are consumed, to form an intermediate I in step e, a solution of the bismuth salt or chelate B in deionised water is prepared by heating under stirring, bismuth oxide $Bi_2O_3$ or a basic bismutyl compound, both individually or collectively referred to as B1, with an excess of from 100% to 700% of the stoichiometric amount of an organic acid B2 and/or an organic chelate former B3, in step f, the solution of the intermediate I of step d is added under stirring to the solution of the bismuth salt or chelate B in deionised water to form a dispersion, and in step g, after optional addition of further water, the dispersion of step f is heated, and epoxide compound E3 is added and reacted until all epoxide groups are consumed to form the chain-extended epoxy amine adduct EA.

13. The process of claim 12 wherein, in step a, the mixture M1 is prepared from an amidoamine A41, an amine A2, and an amine A3.

14. The process of claim 12 wherein step c is executed, and amines A2 and A3 and a phenolic compound A5 are added to the mixture of preceding step a, M1, or to the mixture of preceding step b, M2, to yield a mixture M3.

15. The process according to claim 1 wherein the dried coated substrate is further overcoated by at least one other layer T selected from waterborne or solvent borne two component compositions based on a OH-containing polymers; powder coating compositions; airdrying waterborne or solventborne compositions.

16. The process according to claim 15, wherein the other layer T is a topcoat formulation based on a OH-containing acrylic resin in combination with a polyisocyanate.

* * * * *